US008416898B1

(12) United States Patent
Luo et al.

(10) Patent No.: US 8,416,898 B1
(45) Date of Patent: Apr. 9, 2013

(54) TECHNIQUES FOR DECISION FEEDBACK EQUALIZATION THAT REDUCE VARIATIONS IN THE TAP WEIGHT

(75) Inventors: Mei Luo, San Jose, CA (US); Thungoc M. Tran, San Jose, CA (US); Tim Tri Hoang, San Jose, CA (US); Tin H. Lai, San Jose, CA (US)

(73) Assignee: Altera Corporation, San Jose, CA (US)

( * ) Notice: Subject to any disclaimer, the term of this patent is extended or adjusted under 35 U.S.C. 154(b) by 972 days.

(21) Appl. No.: 12/483,151

(22) Filed: Jun. 11, 2009

(51) Int. Cl.
*H04B 1/10* (2006.01)
(52) U.S. Cl. .......................... 375/350; 375/346; 455/307
(58) Field of Classification Search .................... 375/350
See application file for complete search history.

(56) References Cited

U.S. PATENT DOCUMENTS

2007/0025436 A1   2/2007 Shumarayev et al.

OTHER PUBLICATIONS

U.S. Appl. No. 11/347,527, filed Feb. 3, 2006, inventors: Sergey Shumarayev, et al.

*Primary Examiner* — Erin File
(74) *Attorney, Agent, or Firm* — Steven J. Cahill

(57) ABSTRACT

A circuit includes a receiver circuit, a decision feedback equalizer circuit, and a control loop circuit. The receiver circuit receives a data signal and generates an input signal in response to the data signal. The decision feedback equalizer circuit includes a tap driver and a first current source coupled to the tap driver. The tap driver drives the input signal based on a tap weight. The control loop circuit varies a current through the first current source based on variations in the input signal to reduce changes in the tap weight that are caused by the variations in the input signal.

21 Claims, 8 Drawing Sheets

TECHNIQUES FOR DECISION FEEDBACK EQUALIZATION THAT REDUCE VARIATIONS IN THE TAP WEIGHT

BACKGROUND OF THE INVENTION

The present invention relates to electronic circuits, and more particularly, to techniques for decision feedback equalization that reduce variations in the tap weight.

A high-speed serial interface ("HSSI") may be used to communicate between devices in a system. Typically, a transmitter in such a system transmits a signal to a receiver. The medium that conveys the signal from the transmitter to the receiver usually imposes losses on the signal being transmitted. To maintain accurate, high-speed data transmission, it is necessary for the circuitry to compensate for these losses.

Equalization circuitry is typically among the first circuitry that the incoming signal encounters when it reaches the receiver. Equalization circuitry is designed to respond strongly and rapidly to any transition detected in the received signal. This strong and rapid response restores the original steepness to these transitions, thereby making it possible for further circuitry of the receiver to correctly interpret the signal, even at the very high data rate of that signal.

Decision feedback equalization is a type of equalization that may be performed to compensate for distortion caused by the spreading and overlapping of bits in a data signal (i.e., inter-symbol interference). FIG. 1 illustrates an example of a prior art system that includes a decision feedback equalizer (DFE) 102. In the system of FIG. 1, a receiver circuit 101 receives a differential input voltage signal VIP/VIN at its input terminals. Typically, the differential input voltage signal VIP/VIN is transmitted to receiver 101 through external transmission lines. Receiver 101 transmits the data bits in the differential input voltage signal to inputs of decision feedback equalizer (DFE) circuit 102 and to inputs of clock data recovery (CDR) circuit 103 as a differential output voltage signal VOP/VON.

DFE circuit 102 includes a decision circuit 104, a current mode logic (CML) multiplexer (MUX) buffer circuit 105, a tap driver circuit 106, and a current source 107. Decision circuit 104 samples differential output voltage signal VOP/VON to generate even and odd digital sampled bits DE and DO in alternating unit intervals in response to clock signal CLK. Each unit interval corresponds to one bit period in differential voltage signal VOP/VON. Two unit intervals equal one clock period of clock signal CLK.

CML multiplexer buffer 105 converts the even and odd sampled bits DE and DO into a serial stream of data bits represented by analog differential signal VSP/VSN. Differential signal VSP/VSN is provided to inputs of tap driver 106. The differential output nodes of receiver 101 are coupled to input nodes of CDR circuit 103, the input nodes of DFE 102, and the differential output nodes of tap driver 106. Tap driver circuit 106 adjusts VOP/VON based on the serial stream of data bits represented by VSP/VSN. Tap driver circuit 106 receives bias current from current source 107. The bias current of current source 107 is programmable to provide different tap weights for tap driver 106.

BRIEF SUMMARY OF THE INVENTION

According to some embodiments, a circuit includes a receiver circuit, a decision feedback equalizer circuit, and a control loop circuit. The receiver circuit receives a data signal and generates an input signal in response to the data signal. The decision feedback equalizer circuit includes a tap driver and a first current source coupled to the tap driver. The tap driver drives the input signal based on a tap weight. The control loop circuit varies a current through the first current source based on variations in the input signal to reduce changes in the tap weight that are caused by the variations in the input signal.

Various objects, features, and advantages of the present invention will become apparent upon consideration of the following detailed description and the accompanying drawings.

DETAILED DESCRIPTION OF THE INVENTION

Figure 2:
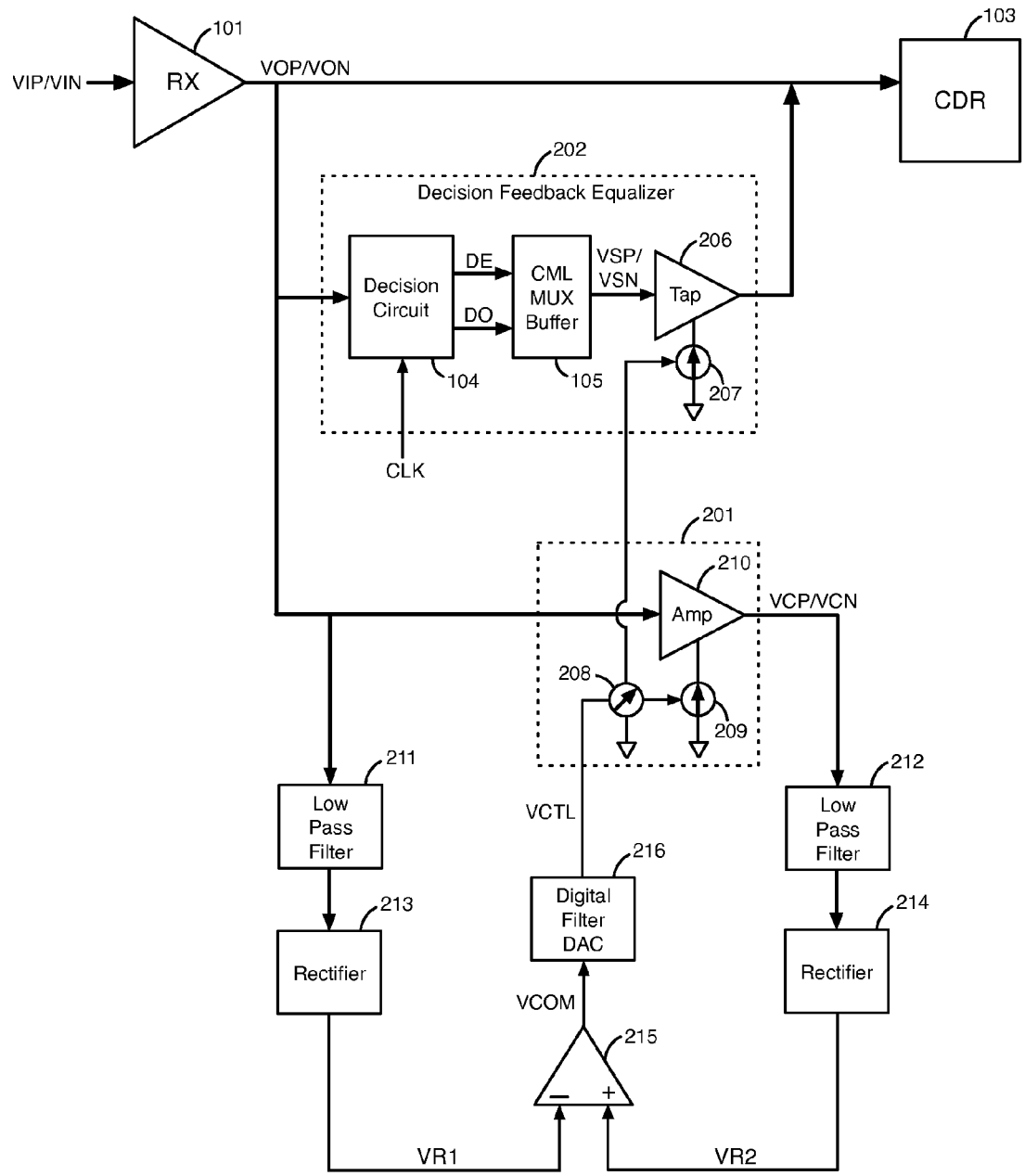
FIG. 2 illustrates an example of a system having a control loop circuit that provides consistent tap weights to a decision feedback equalizer (DFE) across a range of input voltage swing, according to an embodiment of the present invention.

FIG. 2 illustrates an example of a system having a control loop circuit that provides consistent tap weights to a decision feedback equalizer across a range of input voltage swing, according to an embodiment of the present invention. The system of FIG. 2 includes receiver 101, decision feedback equalizer (DFE) circuit 202, clock data recovery (CDR) circuit 103, and a control loop circuit. DFE 202 includes decision circuit 104, CML multiplexer (MUX) buffer 105, tap driver circuit 206, and current source 207. The control loop circuit includes a voltage controlled amplifier circuit 201, low pass filter circuits 211-212, rectifier circuits 213-214, comparator circuit 215, and digital filter and digital-to-analog (DAC) converter circuit 216. Voltage controlled amplifier circuit 201 includes differential amplification circuitry 210, current source 209, and voltage-to-current converter 208.

The circuits shown in FIG. 2 can be fabricated on a single integrated circuit, such as a field programmable gate array (FPGA), programmable logic device (PLD), complex programmable logic device (CPLD), programmable logic array (PLA), application specific integrated circuit (ASIC), general purpose processor, central processing unit (CPU), digital signal processor, controller integrated circuit, memory integrated circuit, analog integrated circuit, or digital integrated circuit.

Receiver circuit 101 receives data bits represented by differential input signal VIP/VIN. VIP/VIN is transmitted from a source external to the integrated circuit (e.g., from a transmitter) through transmission lines. The transmission lines are also external to the integrated circuit and may be located on a circuit board, such as a backplane. The differential input signal typically experiences loss while being transmitted through the transmission lines. The loss in the transmission lines may cause inter-symbol interference (ISI). Differential input signal VIP/VIN refers to voltage VIP minus voltage VIN. The same notation is used for other differential signals referred to herein.

Receiver circuit 101 transmits the data bits in differential input signal VIP/VIN to DFE circuit 202 and CDR circuit 103 as output signal VOP/VON. Decision circuit 104 generates even and odd sampled bits DE and DO from VOP/VON, and CML multiplexer buffer 105 converts the sampled bits DE and DO into a serial stream of data bits represented by analog differential signal VSP/VSN. The analog differential signal VSP/VSN has a fixed peak-to-peak amplitude, e.g., 600 millivolts (mV). The signal swing refers to the maximum value of a signal (single-ended or differential) minus the minimum value of the signal (e.g., in voltage). The peak-to-peak amplitude refers to the maximum voltage of a differential signal minus the minimum voltage of the differential signal. For example, the peak-to-peak amplitude of VSP/VSN equals the maximum voltage of VSP minus the minimum voltage of VSN.

Voltages VSP and VSN are transmitted to inputs of tap driver 206. The differential output nodes of receiver 101 are coupled to input nodes of CDR circuit 103, input nodes of DFE 202, and the differential output nodes of tap driver 206. Tap driver circuit 206 adjusts differential voltage signal VOP/VON at the input nodes of CDR circuit 103 based on the serial stream of sampled data bits represented by VSP/VSN. DFE 202 has a delay of one unit interval between its input and output signals. DFE 202 boosts and inverts the voltage of each bit in signal VOP/VON and then combines the result with the next bit in the differential output signal of receiver 101, as shown below in equation (1).

$$\text{Input} = RX\,\text{Output} + (A \times Y) \quad (1)$$

In equation (1), RX Output represents a bit in the differential output signal VOP/VON of receiver 101, Input represents a bit in the signal VOP/VON as transmitted to the inputs of CDR circuit 103, A represents the tap weight of DFE 202, and Y is a bit in the feedback output of DFE 202. Bits in Y are inverted and delayed by one unit interval relative to bits in RX Output.

The Input bits in equation (1) are provided to inputs of clock data recovery (CDR) circuit 103 as differential voltage VOP/VON. DFE 202 boosts the high frequency component of the signal VOP/VON provided to CDR 103. CDR circuit 103 may recover data bits and a clock signal from signal VOP/VON.

Figure 3:
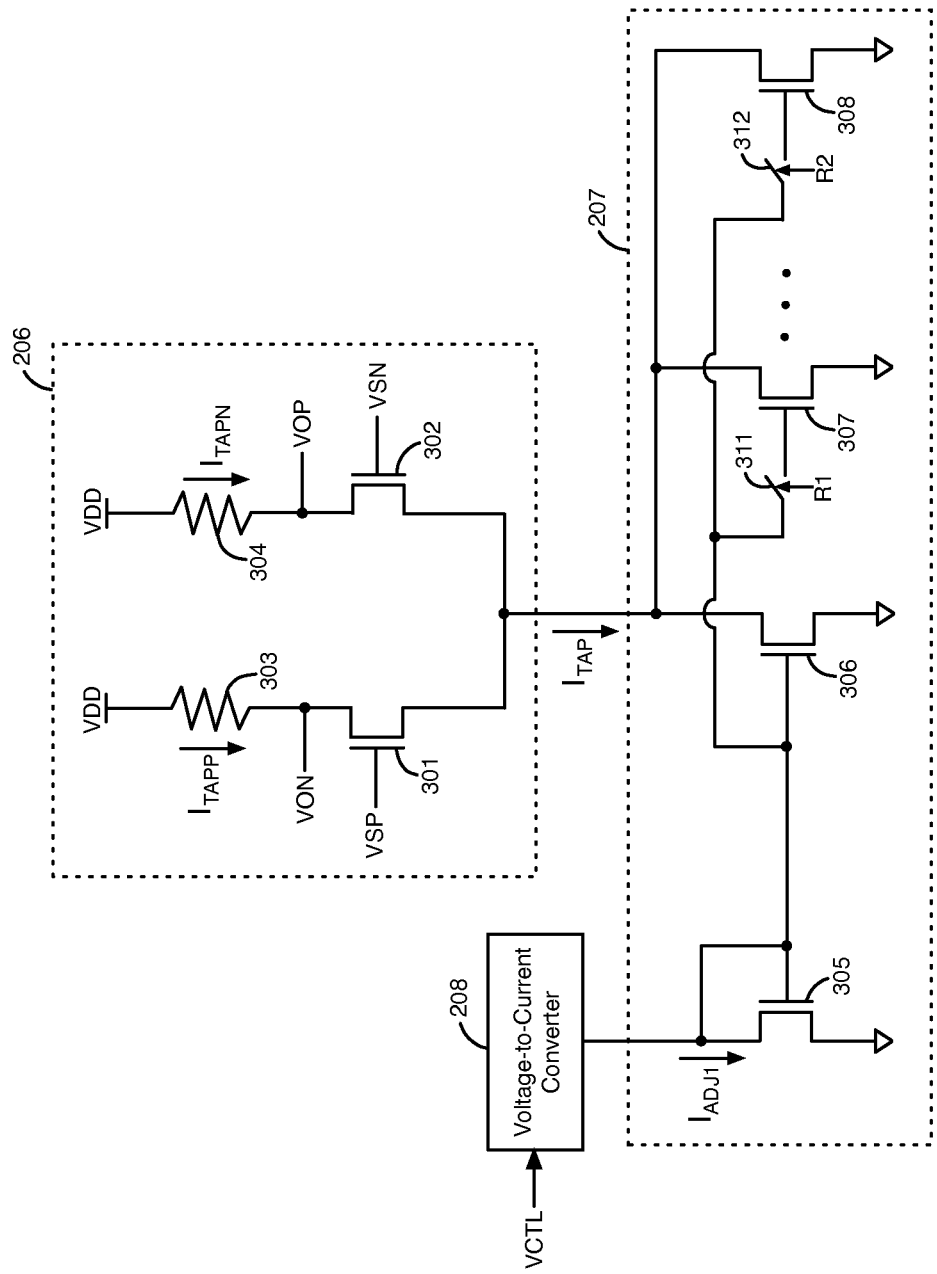
FIG. 3 illustrates example architectures for the tap driver circuit and current source of FIG. 2, according to embodiments of the present invention.

Tap driver circuit 206 receives bias current $I_{TAP}$ from current source 207. FIG. 3 illustrates example architectures for tap driver circuit 206 and current source 207, according to embodiments of the present invention. In the example of FIG. 3, tap driver circuit 206 is a differential current mode logic (CML) driver circuit that includes a differential pair of n-channel metal oxide semiconductor field-effect transistors (MOSFETs) 301-302 and load resistors 303-304. Current source 207 includes n-channel MOSFETs 305-308 and switches 311-312.

Transistors 301-302 receive input voltage signals VSP and VSN from multiplexer buffer 105 at their respective gate terminals. Output voltage VOP is generated between resistor 304 and transistor 302, and output voltage VON is generated between resistor 303 and transistor 301. Current source 207 controls the current $I_{TAP}$ through tap driver 206.

If the positive end VSP of the input data signal is higher than the negative end VSN of the input data signal, more current $I_{TAP}$ from current source 207 is permitted to flow through transistor 301 than through transistor 302. As a result, the voltage drop across resistor 303 is greater than the voltage drop across resistor 304. This causes the positive end VOP of the output signal to have a higher voltage than the negative end VON of the output signal. On the other hand, if the negative end VSN of the input data signal is higher than the positive end VSP of the input data signal, the voltage drop across resistor 304 is greater than the voltage drop across resistor 303, and the negative end VON of the output signal has a higher voltage than the positive end VOP of the output signal. In this approach, tap driver 206 produces an output signal VOP/VON that has the same basic pattern as the received data signal VSP/VSN.

Current source 207 is a variable and programmable current source. The gate terminals of transistors 307-308 are coupled to switches 311-312, respectively. Switches 311-312 are closed to couple the gates of transistors 307-308, respectively, to the gates of transistors 305 and 306. Switches 311-312 are opened to decouple the gates of transistors 307-308, respectively, from the gates of transistors 305 and 306.

Although only 3 MOSFETs 306-308 are shown as being coupled to transistors 301-302 in FIG. 3, current source 207 can have any suitable number of n-channel MOSFETs (e.g., 7) coupled in parallel between the sources of transistors 301-302 and ground in addition to a suitable number (e.g., 6) of switches. Each of the switches is coupled between the gate of transistor 305 and the gate of an additional n-channel MOSFET that is coupled in parallel between transistors 301-302 and ground, as shown with respect to switches 311-312.

Control signals R1 and R2 control the conductive states of switches 311 and 312, respectively. Additional control signals can control the conductive states of additional switches in current source 207. Closing one or both of switches 311-312 increases the current $I_{TAP}$ through current source 207, and opening one or both of switches 311-312 decreases the current $I_{TAP}$ through current source 207. Thus, the bias current $I_{TAP}$ provided to tap driver circuit 206 can be adjusted by changing the conductive states of one or more of switches 311-312 and the other switches coupled to the gates of other MOSFETs in current source 207.

The bias current $I_{TAP}$ that current source 207 provides to tap driver circuit 206 can be adjusted by changing the conductive states of the switches 311, 312, etc. to provide different tap weights to output signal VOP/VON. For example, the bias current $I_{TAP}$ can be adjusted to compensate for transmission lines that cause more or less loss in differential signal VIP/VIN.

The current through resistor 303 is referred to as $I_{TAPP}$, and the current through resistor 304 is referred to as $I_{TAPN}$. The tap weight of DFE 202 is shown below in equation (2).

$$\text{Tap weight} = ((I_{TAPP} - I_{TAPN})R)/((I_{EQP} - I_{EQN})R) = (I_{TAPP} - I_{TAPN})/(I_{EQP} - I_{EQN}) \quad (2)$$

In equation (2), $I_{TAP} - I_{TAPN}$ equals the steering current of tap driver 206, and $I_{EQP} - I_{EQN}$ equals the steering current of receiver circuit 101. R in equation (2) is the resistance of each of resistors 303-304. Resistors 303-304 also function as the load resistors for receiver circuit 101. In this example embodiment, the tap weight of DFE 202 equals the steering current of tap driver 206 divided by the steering current of receiver circuit 101. Adjusting the bias current through current source 207 (i.e., by changing the conductive states of one or more of switches 311-312, etc.) changes the tap weight of DFE 202.

The control loop circuit in FIG. 2 adjusts the bias current $I_{TAP}$ that current source 207 provides to differential pair 301-302 based on changes in differential voltage signal VOP/VON. The control loop adjusts $I_{TAP}$ by varying current $I_{ADJ1}$ through transistor 305. Transistors 305-306 are coupled in a current mirror configuration. Transistors 305-308 are coupled in a current mirror configuration when switches 311-312 are closed. Current $I_{ADJ1}$ is mirrored through transistors 306-308 according to the relative width-to-length channel ratios of transistors 305-308. In one embodiment, transistors 305-308 all have the same width-to-length channel ratios, and $I_{TAP}$ equals M times $I_{ADJ1}$, where M is the number of transistors 306-308 etc. that are turned on and add current to $I_{TAP}$.

The control loop of FIG. 2 is now described in detail. Low pass filter 211 in the control loop filters differential voltage signal VOP/VON to attenuate the high frequency components of VOP/VON. Rectifier 213 is coupled to the outputs of low pass filter 211. Rectifier 213 is a full-wave rectifier that rectifies the low frequency components of the differential voltage signal filtered by low pass filter 211 to generate a single-ended direct current (DC) analog voltage signal VR1 at the inverting input of comparator 215.

Voltage controlled amplifier circuit 201 in the control loop generates a differential output voltage signal VCP/VCN that is based on the differential output voltage signal VOP/VON of receiver circuit 101. Voltage signal VCP/VCN is used as a feedback signal in the control loop. Low pass filter 212 filters the differential output voltage signal VCP/VCN of amplifier 201 to attenuate the high frequency components of VCP/VCN. Rectifier 214 is coupled to the outputs of low pass filter 212. Rectifier 214 is a full-wave rectifier that rectifies the low frequency components of the differential voltage signal filtered by low pass filter 212 to generate a single-ended DC analog voltage signal VR2 at the non-inverting input of comparator 215.

Low pass filters 211 and 212 are active low pass filter circuits that reduce loss. Each low pass filter 211 and 212 includes two filters that filter the positive and negative ends of the differential voltage signals VOP/VON and VCP/VCN, respectively. Each of the filters in low pass filters 211-212 can, for example, be implemented using a common source field-effect transistor, a load resistor coupled between a supply voltage and the drain of the transistor, a second resistor coupled between the source of the transistor and ground, and a capacitor coupled between the drain of the transistor and ground.

Rectifiers 213-214 extract the DC energy in differential voltage signals VOP/VON and VCP/VCN to generate voltages VR1 and VR2, respectively. Thus, the voltage levels of VR1 and VR2 represent the energy of the low frequency components of differential voltages VOP/VON and VCP/VCN, respectively.

Comparator circuit 215 compares DC analog voltages VR1 and VR2 to generate a digital output voltage signal VCOM. When VR2 is greater than VR1, comparator 215 generates a logic high state in voltage VCOM. When VR2 is less than VR1, comparator 215 generates a logic low state in voltage VCOM.

Digital output voltage signal VCOM is transmitted to an input of digital filter and digital-to-analog converter circuit 216. The digital filter in circuit 216 filters the digital output voltage VCOM of comparator 215 to generate a filtered digital signal. The digital filter in circuit 216 includes, for example, a counter circuit that counts up or down based on the logic state of voltage VCOM. The counter outputs, for example, 8 digital signals (i.e., 8 bits). The counter increases or decreases the binary value of the 8 digital output signals based on the logic state of VCOM. The digital-to-analog converter in circuit 216 converts the 8 digital signals into an analog control voltage VCTL. VCTL varies based on voltage VCOM.

The analog control voltage signal VCTL is transmitted to an input of voltage-to-current converter 208 in voltage controlled amplifier 201. As shown in FIG. 3, voltage-to-current converter 208 converts control voltage VCTL into current $I_{ADJ1}$. Voltage-to-current converter 208 adjusts current $I_{ADJ1}$ based on changes in the voltage of VCTL. In some embodiments, voltage-to-current converter 208 can control multiple tap weights in the system of FIG. 2 that are provided by multiple tap drivers. Each of the tap drivers compensates for a prior data bit in input signal VIP/VIN.

Figure 4:
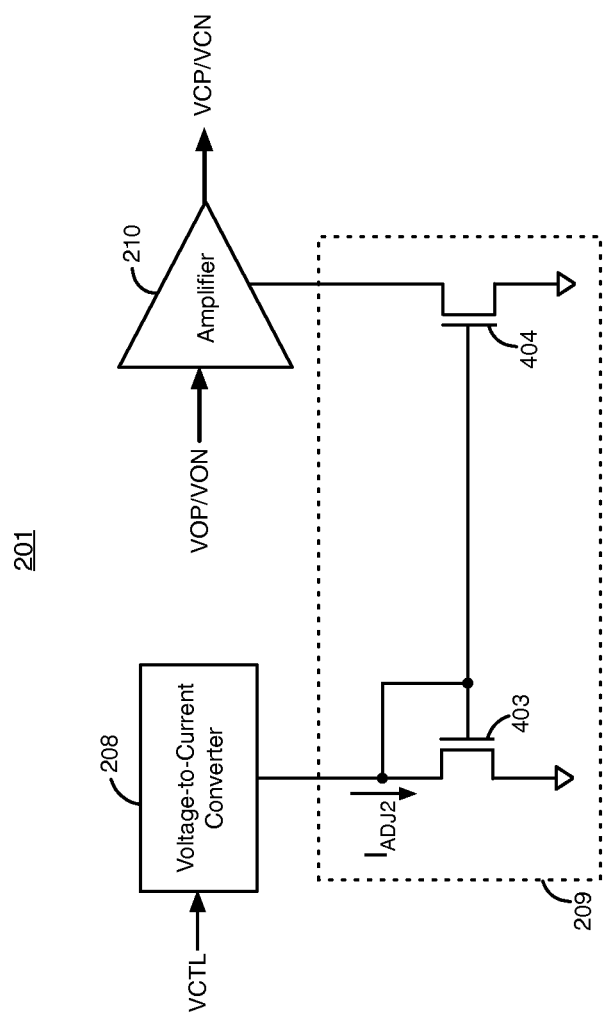
FIG. 4 illustrates additional details of the voltage controlled amplifier circuit of FIG. 2, according to an embodiment of the present invention.

FIG. 4 illustrates additional details of voltage controlled amplifier circuit 201, according to an embodiment of the present invention. As shown in FIG. 4, current source 209 includes n-channel MOSFETs 403-404. The sources of n-channel transistors 403-404 are coupled to receive a ground voltage.

Control voltage VCTL is provided to an input of voltage-to-current converter 208. Voltage-to-current converter 208 adjusts the magnitude of its second output current $I_{ADJ2}$ based on variations in the voltage of VCTL. Current $I_{ADJ2}$ flows through transistor 403. Transistors 403 and 404 are coupled in a current mirror configuration. Current $I_{ADJ2}$ is mirrored through transistor 404 according to the relative width-to-length channel ratios of transistors 403 and 404.

The drain of transistor 404 is coupled to differential amplification circuitry 210. Differential amplification circuitry 210 can, for example, include a CML driver circuit that is similar to or identical to the circuitry of tap driver 206 shown in FIG. 3. The CML driver circuit may include a differential pair of transistors and load resistors that are coupled as shown in FIG. 3.

Transistor 404 provides a bias current for differential amplification circuitry 210. The current through transistor 404 flows through one or both of the transistors in a differential pair within differential amplification circuitry 210. Differential amplification circuitry 210 amplifies differential voltage signal VOP/VON at its inputs to generate differential output voltage VCP/VCN at its outputs using the bias current from transistor 404. Amplification circuitry 210 and current source 209 form a limiting amplifier.

When the peak-to-peak amplitude of differential voltage VOP/VON increases, voltage VR1 increases relative to voltage VR2. When voltage VR2 is less than voltage VR1, the output voltage VCOM of comparator 215 is in a logic low state, causing voltage VCTL to decrease. The decrease in voltage VCTL causes currents $I_{ADJ1}$ and $I_{ADJ2}$ to increase. The bias current through transistor 404 increases in response to the increase in $I_{ADJ2}$. The increase in the bias current through transistor 404 causes voltage controlled amplifier circuit 201 to increase the voltage differential between voltages VCP and VCN, which causes VR2 to increase. The bias current $I_{TAP}$ through current source 207 increases in response to the increase in $I_{ADJ1}$. The increase in $I_{TAP}$ causes tap driver 206 to increase the voltage differential between its output signals VOP and VON.

When the peak-to-peak amplitude of differential voltage VOP/VON decreases, voltage VR1 decreases relative to voltage VR2. When voltage VR2 is greater than voltage VR1, the output voltage VCOM of comparator 215 is in a logic high state, causing voltage VCTL to increase. The increase in voltage VCTL causes currents $I_{ADJ1}$ and $I_{ADJ2}$ to decrease. The bias current through transistor 404 decreases in response to the decrease in $I_{ADJ2}$. The decrease in the bias current through transistor 404 causes voltage controlled amplifier circuit 201 to decrease the voltage differential between voltages VCP and VCN, which causes VR2 to decrease. The bias current $I_{TAP}$ through current source 207 decreases in response to the decrease in $I_{ADJ1}$. The decrease in $I_{TAP}$ causes tap driver 206 to decrease the voltage differential between its output signals VOP and VON.

When voltages VR1 and VR2 are the same voltage or near the same voltage, the output voltage VCOM of comparator 215 toggles between logic high and low states, causing voltage VCTL to remain at about the same voltage. As a result, currents $I_{ADJ1}$, $I_{ADJ2}$, $I_{TAP}$, and the bias current through transistor 404 remain at stable or near stable values.

Voltage controlled amplifier circuit 201 varies the peak-to-peak amplitude of its differential output voltage VCP/VCN based on changes in the peak-to-peak amplitude of the differential output voltage VOP/VON of receiver circuit 101. Thus, VCP/VCN tracks VOP/VON. VCP/VCN also varies based on changes in the peak-to-peak amplitude of differential input voltage VIP/VIN, because VOP/VON varies based on VIP/VIN, as shown, for example, in FIG. 5A.

Figure 5A:
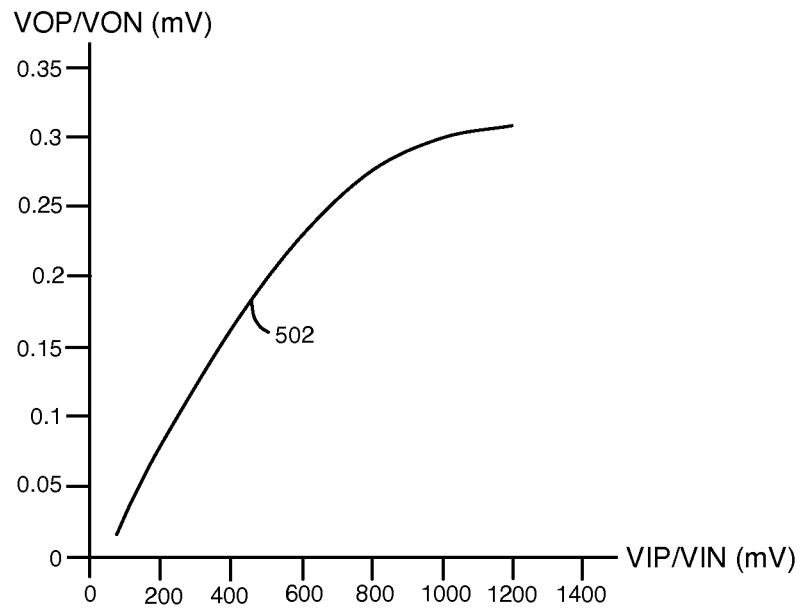
FIG. 5A is a graph that illustrates the relationship between the peak-to-peak amplitude of the differential input voltage VIP/VIN at DC and the peak-to-peak amplitude of the differential output voltage VOP/VON at DC for an example implementation of a receiver circuit, according to an embodiment of the present invention.

FIG. 5A is a graph that illustrates the relationship between the peak-to-peak amplitude of the differential input voltage VIP/VIN at DC and the peak-to-peak amplitude of the differential output voltage VOP/VON at DC for an example implementation of receiver circuit 100, according to an embodiment of the present invention. The curve 502 in FIG. 5A illustrates an example of how the peak-to-peak amplitude of differential output voltage VOP/VON varies based on changes in the peak-to-peak amplitude of differential input voltage VIP/VIN.

The adjustable currents $I_{ADJ1}$ and $I_{ADJ2}$ generated by voltage-to-current converter 208 vary based on changes in the peak-to-peak amplitudes of differential voltages VOP/VON and VIP/VIN. Because $I_{ADJ1}$ tracks VOP/VON, the bias current $I_{TAP}$ that current source 207 provides to tap driver circuit 206 varies based on changes in the peak-to-peak amplitudes of differential voltages VOP/VON and VIP/VIN.

Figure 5B:
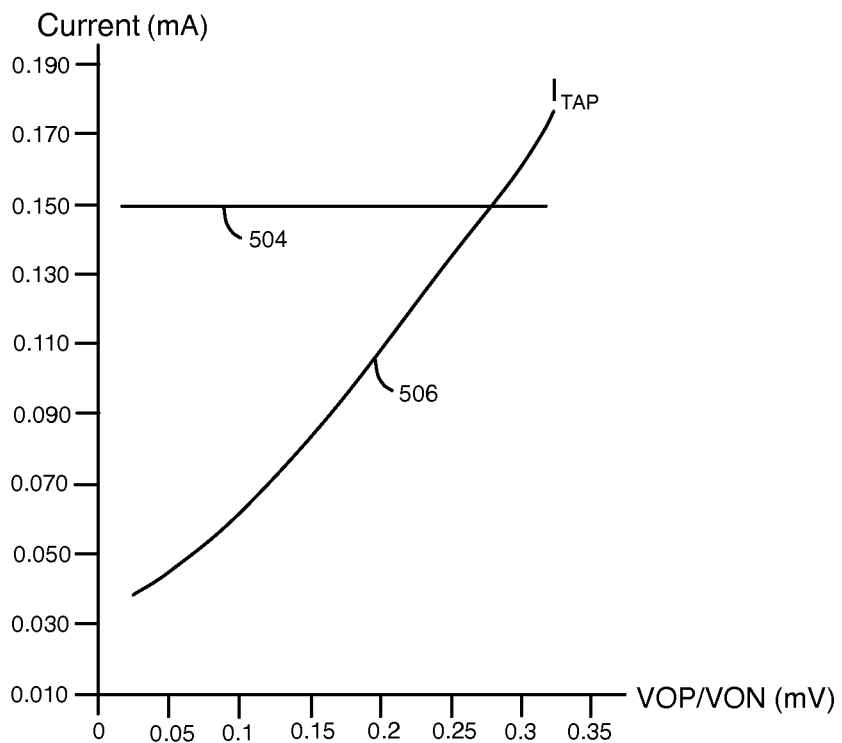
FIG. 5B is a graph that illustrates an example of the relationship between the bias current of the current source that provides current to the tap driver and the differential output voltage VOP/VON of the receiver circuit, according to an embodiment of the present invention.

FIG. 5B is a graph that illustrates an example of the relationship between the bias current $I_{TAP}$ of current source 207 and the differential output voltage VOP/VON of receiver circuit 101, according to an embodiment of the present invention. Line 504 represents the current of current source 107 in DFE 102, which is fixed for a particular tap weight. Curve 506 represents the current $I_{TAP}$ of current source 207. Curve 506 shows an example of how the control loop of FIG. 2 can cause $I_{TAP}$ to vary in proportion to changes in differential voltage VOP/VON for a particular tap weight. Thus, $I_{TAP}$ is proportional to VOP−VON.

Because bias current $I_{TAP}$ tracks changes in VOP/VON and VIP/VIN, the differential output voltage of tap driver circuit 206 varies based on changes in the peak-to-peak amplitudes of VOP/VON and VIP/VIN, even though the peak-to-peak amplitude of the differential input voltage signal VSP/VSN to tap driver 206 does not change in response to variations in the peak-to-peak amplitude of VOP/VON. When the control loop increases $I_{TAP}$ based on an increase in the peak-to-peak amplitude of VOP/VON, tap driver circuit 206 increases the peak-to-peak amplitude of its differential output voltage. When the control loop decreases $I_{TAP}$ based on a decrease in the peak-to-peak amplitude of VOP/VON, tap driver circuit 206 decreases the peak-to-peak amplitude of its differential output voltage.

The control loop circuit of FIG. 2 varies $I_{TAP}$ based on changes in differential signal VOP/VON to cause the tap weight of DFE circuit 202 to change significantly less after changes in the peak-to-peak amplitude of differential input voltage VIP/VIN. The control loop circuit of FIG. 2 is designed to cause each of the tap weights of DFE circuit 202 to remain at a more consistent value over a voltage range of the peak-to-peak amplitude of differential input voltage VIP/VIN. In some embodiments, the control loop of FIG. 2 generates one or more tap weights that are constant across a range of VIP/VIN.

Figure 1:
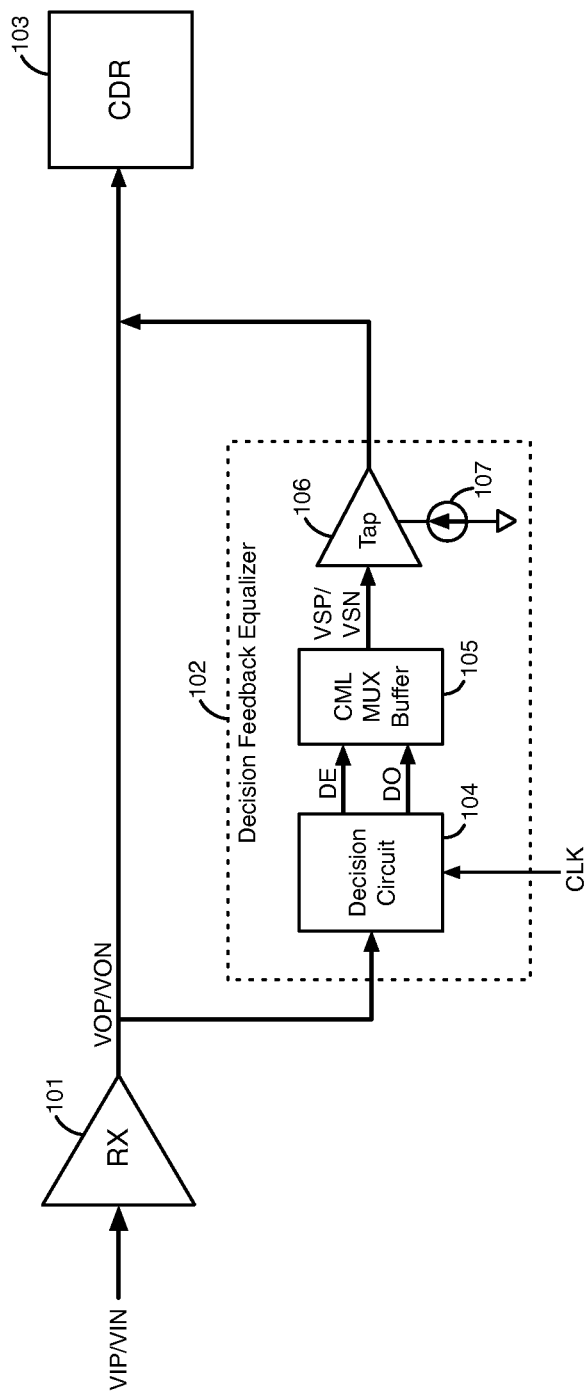
FIG. 1 illustrates an example of a prior art system that includes a decision feedback equalizer (DFE).
Figure 6:
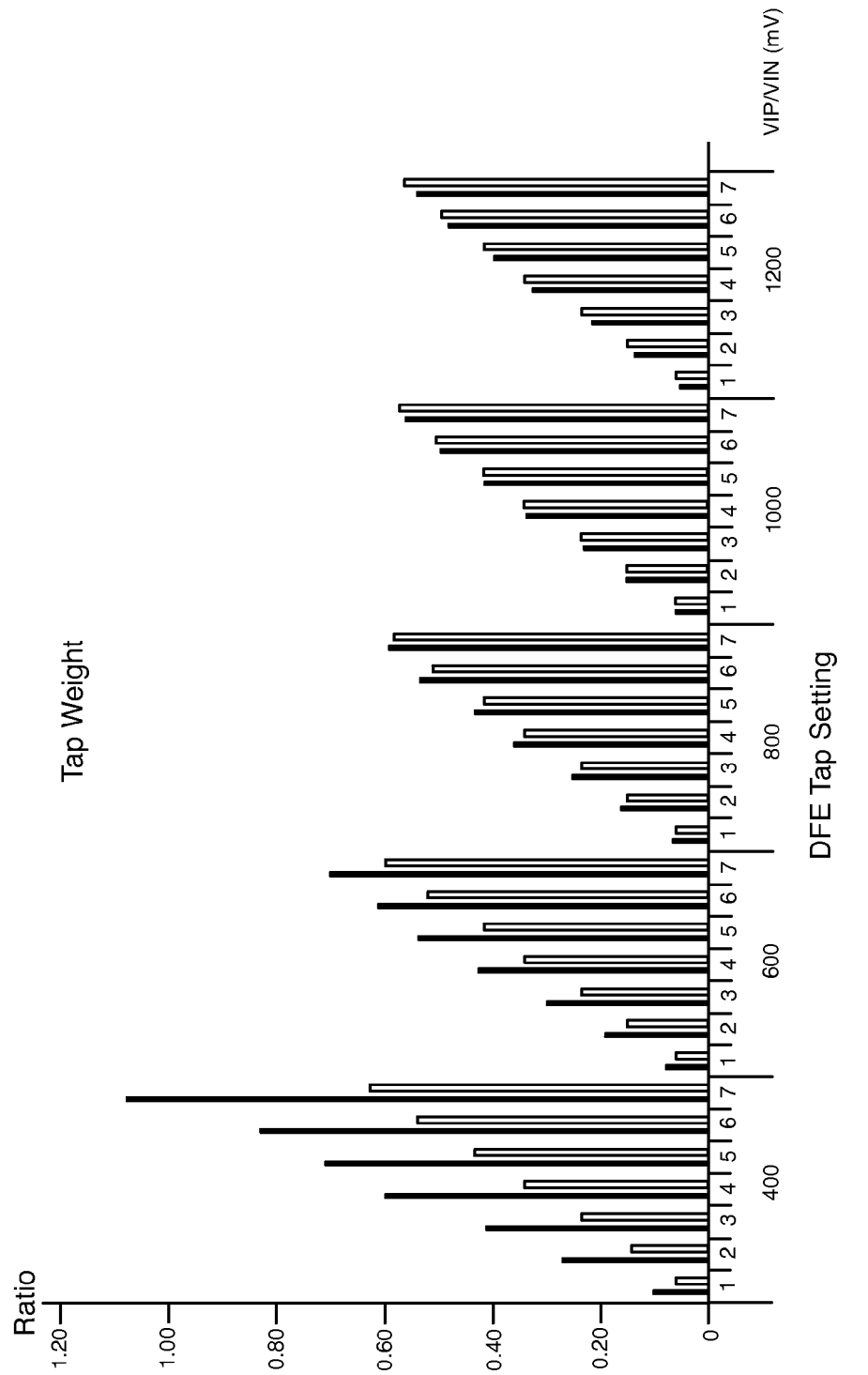
FIG. 6 is a graph that illustrates examples of variable tap weights for the prior art DFE circuit of FIG. 1 and the DFE circuit of FIG. 2.

FIG. 6 is a graph that illustrates examples of variable tap weights for DFE 102 and DFE 202, according to an embodiment of the present invention. FIG. 6 shows 35 pairs of solid and outlined bars for tap weights 1-7 over a range of 5 different peak-to-peak amplitudes of input voltage VIP/VIN. The solid bars on the left of each pair of bars in FIG. 6 represent tap weights for DFE circuit 102 of FIG. 1. The outlined bars on the right side of each pair of bars in FIG. 6 represent tap weights for DFE circuit 202 of FIG. 2. The 7 different tap weights are generated by varying the conductive states of switches 311-312 and 4 other corresponding switches in current source 207 to vary bias current $I_{TAP}$, as described above. The 5 different peak-to-peak amplitudes of input voltage VIP/VIN are 400 mV, 600 mV, 800 mV, 1000 mV, and 1200 mV. The tap weights are expressed as ratios on the Y-axis of the graph of FIG. 6.

As shown in FIG. 6, the circuitry of FIG. 2 causes each of the 7 tap weights of DFE 202 to vary by substantially smaller ratios over the range of input voltage VIP/VIN from 400-1200 mV. For example, tap weight 7 varies by a much smaller percentage in DFE 202 than in DFE 102. Tap weight 7 in DFE 102 varies from a ratio of about 1.08 at 400 mV VIP/VIN to a ratio of about 0.53 at 1200 mV VIP/VIN. On the other hand, tap weight 7 in DFE 202 varies from a ratio of about 0.62 at 400 mV VIP/VIN to a ratio of about 0.57 at 1200 mV VIP/VIN. Non-linearity in the system of FIG. 2 may cause small variations in the tap weights of DFE 202.

Thus, the system of FIG. 2 provides more consistent tap weights for DFE 202 that vary substantially less over a wide range of the peak-to-peak amplitude of input voltage VIP/VIN. Providing tap weights for DFE 202 that vary by much smaller amounts over a range of VIP/VIN reduces the amount of compensation that needs to be provided for the variable tap weights so that the system of FIG. 2 captures the correct values of the data represented by input signal VIP/VIN. A user of the system of FIG. 2 does not need to test the system to determine the values of the tap weights for a given peak-to-peak amplitude of VIP/VIN. Instead, recommended tap weights can be provided to users of the system of FIG. 2 for a range of peak-to-peak amplitudes of VIP/VIN, as shown, e.g., by the outlined bars in FIG. 6. The recommended tap weights can be used to compensate for the small variations in the tap weights in the system of FIG. 2.

Figure 7:
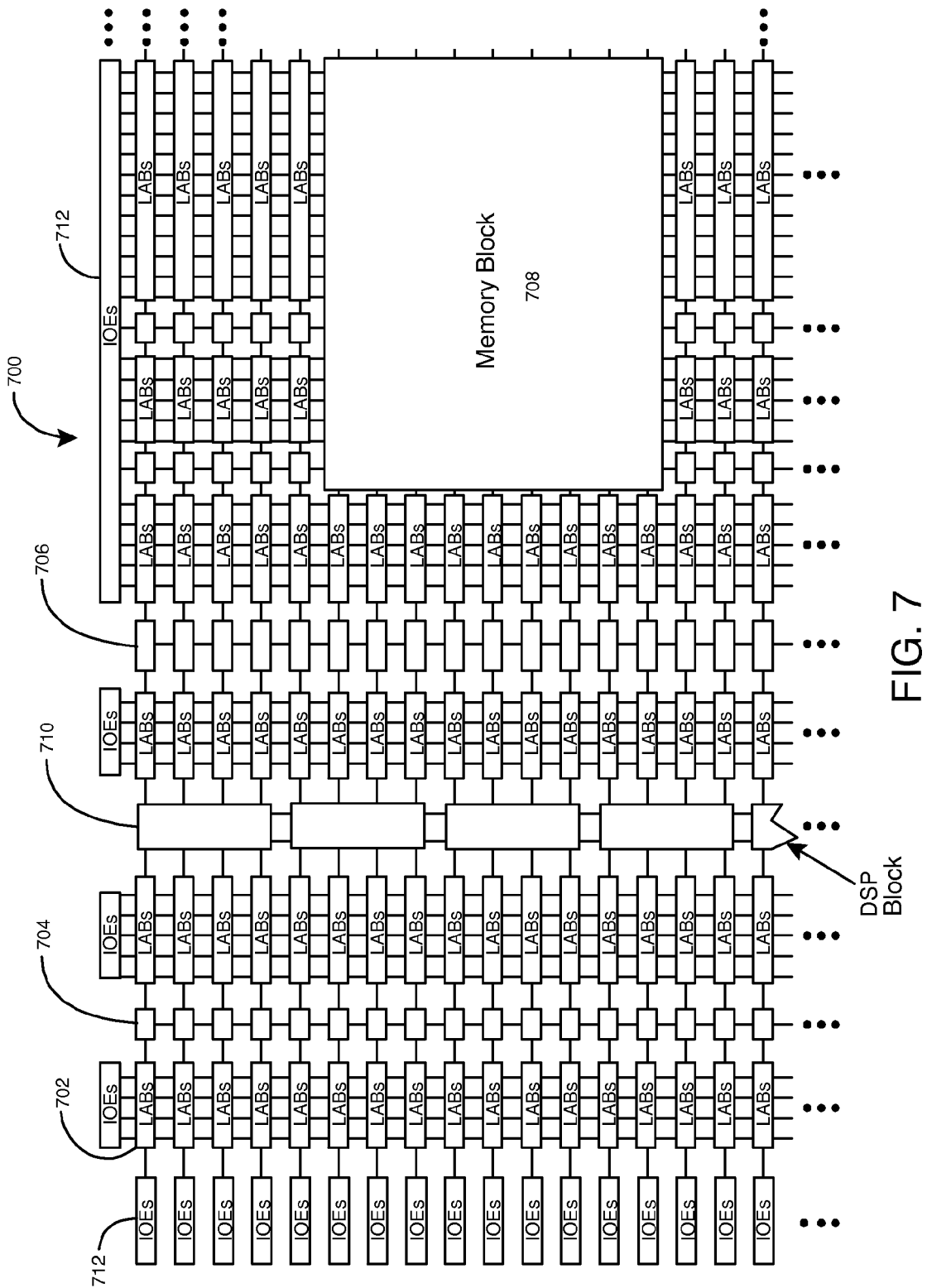
FIG. 7 is a simplified partial block diagram of a field programmable gate array (FPGA) that can include aspects of the present invention.

FIG. 7 is a simplified partial block diagram of a field programmable gate array (FPGA) 700 that can include aspects of the present invention. FPGA 700 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 700 includes a two-dimensional array of programmable logic array blocks (or LABs) 702 that are interconnected by a network of column and row interconnect conductors of varying length and speed. LABs 702 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 700 also includes a distributed memory structure including random access memory (RAM) blocks of varying sizes provided throughout the array. The RAM blocks include, for example, blocks 704, blocks 706, and block 708. These memory blocks can also include shift registers and first-in-first-out (FIFO) buffers.

FPGA 700 further includes digital signal processing (DSP) blocks 710 that can implement, for example, multipliers with add or subtract features. Input/output elements (IOEs) 712 located, in this example, around the periphery of the chip, support numerous single-ended and differential input/output standards. IOEs 712 include input and output buffers that are coupled to pads of the integrated circuit. The pads are external terminals of the FPGA die that can be used to route, for example, input signals, output signals, and supply voltages between the FPGA and one or more external devices. It is to be understood that FPGA 700 is described herein for illustrative purposes only and that the present invention can be implemented in many different types of PLDs, FPGAs, and ASICs.

Figure 8:
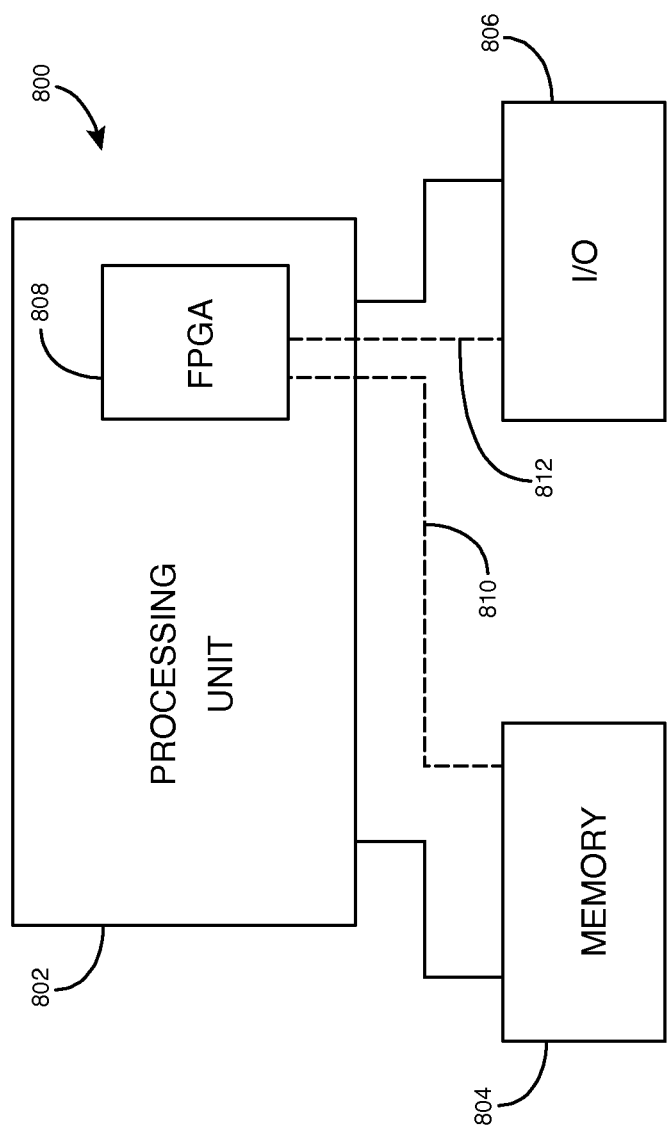
FIG. 8 shows a block diagram of an exemplary digital system that can embody techniques of the present invention.

The present invention can also be implemented in a system that has an FPGA as one of several components. FIG. 8 shows a block diagram of an exemplary digital system 800 that can embody techniques of the present invention. System 800 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 800 can be provided on a single board, on multiple boards, or within multiple enclosures.

System 800 includes a processing unit 802, a memory unit 804, and an input/output (I/O) unit 806 interconnected together by one or more buses. According to this exemplary embodiment, an FPGA 808 is embedded in processing unit 802. FPGA 808 can serve many different purposes within the system of FIG. 8. FPGA 808 can, for example, be a logical building block of processing unit 802, supporting its internal and external operations. FPGA 808 is programmed to implement the logical functions necessary to carry on its particular role in system operation. FPGA 808 can be specially coupled to memory 804 through connection 810 and to I/O unit 806 through connection 812.

Processing unit 802 can direct data to an appropriate system component for processing or storage, execute a program stored in memory 804, receive and transmit data via I/O unit 806, or other similar functions. Processing unit 802 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 808 can control the logical operations of the system. As another example, FPGA 808 acts as a reconfigurable processor that can be reprogrammed as needed to handle a particular computing task. Alternatively, FPGA 808 can itself include an embedded microprocessor. Memory unit 804 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
 a receiver circuit that receives a data signal and generates an input signal based on the data signal;
 a decision feedback equalizer circuit comprising a tap driver and a first current source coupled to the tap driver, wherein the tap driver drives the input signal based on a tap weight; and
 a control loop circuit that varies a current through the first current source based on variations in the input signal to reduce changes in the tap weight that are caused by the variations in the input signal.

2. The circuit defined in claim 1 further comprising:
 a clock data recovery circuit that receives the input signal, wherein the tap weight is based on a steering current of the tap driver divided by a steering current of the receiver circuit.

3. The circuit defined in claim 1 wherein the control loop circuit comprises an amplifier that generates a feedback signal based on the input signal and a control signal, and wherein the control signal varies based on changes in the feedback signal.

4. The circuit defined in claim 3 wherein the amplifier comprises a second current source that provides current to the amplifier, and wherein the control signal varies a current through the second current source based on changes in the feedback signal.

5. The circuit defined in claim 3 wherein the control loop circuit further comprises:
 a first low pass filter that filters the input signal to generate a first filtered signal;
 a first rectifier that rectifies the first filtered signal to generate a first rectified signal;
 a second low pass filter that filters the feedback signal to generate a second filtered signal; and
 a second rectifier that rectifies the second filtered signal to generate a second rectified signal.

6. The circuit defined in claim 5 wherein the control loop circuit further comprises:
 a comparator that compares the first rectified signal with the second rectified signal to generate a digital comparison signal; and a digital-to-analog converter circuit that converts the digital comparison signal into the control signal.

7. The circuit defined in claim 6 wherein the amplifier further comprises a second current source and a voltage-to-current converter, wherein the voltage-to-current converter converts the control signal into a variable current, wherein the second current source provides bias current in the amplifier, and wherein the bias current through the second current source varies based on the variable current.

8. The circuit defined in claim 1 wherein the current through the first current source is programmable, wherein the tap weight changes in response to programming a different current through the first current source, and wherein the first current source provides a bias current to the tap driver.

9. The circuit defined in claim 8 wherein the decision feedback equalizer circuit further comprises a decision circuit that generates sampled bits based on the input signal and a multiplexer that generates a differential voltage signal that represents a serial stream of the sampled bits, wherein the differential voltage signal is provided to differential inputs of the tap driver, and wherein a peak-to-peak amplitude of the differential voltage signal remains constant over variations in the input signal to the decision feedback equalizer circuit.

10. The circuit defined in claim 1 wherein the circuit is fabricated on a field programmable gate array integrated circuit.

11. A circuit comprising:
means for generating an input signal in response to a data signal;
means for compensating for distortion in the input signal using a tap driver and a first current source that provides current to the tap driver, wherein the tap driver drives the input signal based on a tap weight, and the tap weight is based on a steering current of the tap driver and a steering current of the means for generating the input signal; and
means for varying a current through the first current source based on variations in the input signal to reduce changes in the tap weight that are caused by the variations in the input signal.

12. The circuit defined in claim 11 wherein the means for varying a current through the first current source based on variations in the input signal further comprises means for generating a feedback signal in response to the input signal and a control signal, and wherein the control signal varies based on changes in the feedback signal.

13. The circuit defined in claim 12 wherein the means for generating a feedback signal further comprises a second current source and a means for converting the control signal into a variable current, wherein the second current source provides bias current in the means for generating a feedback signal, and wherein the bias current through the second current source varies based on the variable current.

14. The circuit defined in claim 12 wherein the means for varying a current through the first current source based on variations in the input signal further comprises:
a first means for attenuating high frequency components of the input signal to generate a first filtered signal;
a first means for rectifying the first filtered signal to generate a first rectified signal;
a second means for attenuating high frequency components of the feedback signal to generate a second filtered signal; and
a second means for rectifying the second filtered signal to generate a second rectified signal.

15. The circuit defined in claim 14 wherein the means for varying a current through the first current source based on variations in the input signal further comprises:
a means for comparing the first rectified signal with the second rectified signal to generate a digital comparison signal; and
a means for converting the digital comparison signal into an analog signal, wherein the analog signal is the control signal.

16. The circuit defined in claim 12 wherein the input signal is a first differential voltage signal, and the feedback signal is a second differential voltage signal.

17. The circuit defined in claim 11 wherein the current through the first current source is programmable, wherein the tap weight changes in response to programming a different current through the first current source, and wherein the first current source provides a bias current to a differential pair of transistors in the tap driver.

18. A method comprising:
generating an input signal in response to a data signal;
sampling the input signal to generate an intermediate signal representing bits in the input signal;
driving the input signal in response to the intermediate signal using a tap driver having a first variable current that generates a tap weight, wherein the tap weight is based on a steering current of the tap driver and a steering current used to generate the input signal; and
varying the first variable current based on variations in the input signal to reduce changes in the tap weight that are caused by the variations in the input signal.

19. The method defined in claim 18 wherein varying the first variable current based on variations in the input signal to reduce changes in the tap weight that are caused by the variations in the input signal further comprises:
generating a feedback signal based on the input signal;
filtering and rectifying the feedback signal to generate a first rectified signal; and
filtering and rectifying the input signal to generate a second rectified signal.

20. The method defined in claim 19 wherein varying the first variable current based on variations in the input signal to reduce changes in the tap weight that are caused by the variations in the input signal further comprises:
comparing the first rectified signal to the second rectified signal to generate a digital comparison signal;
converting the digital comparison signal into an analog control signal; and
varying the first variable current based on changes in the analog control signal.

21. The method defined in claim 18 wherein varying the first variable current based on variations in the input signal to reduce changes in the tap weight that are caused by the variations in the input signal further comprises generating a feedback signal based on the input signal using an amplifier and varying a second variable current through the amplifier based on the feedback signal.

* * * * *